UNITED STATES PATENT OFFICE 2,680,112

POLYMERIC QUATERNARY AMMONIUM POLYTUNGSTATES

William O. Forshey, Jr., New Castle, and James E. Kirby, Wilmington, Del., assignors to E. I. du Pont de Nemours & Company, Wilmington, Del., a corporation of Delaware No Drawing. Application February 23, 1952,
Serial No. 273,146

27 Claims. (Cl. 260—85.5)

This invention relates to new addition polymers and copolymers.

The advent of new synthetic fibers and films has been attended by many advantages but has also occasioned new problems. For instance, acrylonitrile polymers are outstanding in many applications because of their inertness but this same inertness has rendered difficult their processing in extended form, i. e., in film or fiber form, particularly when the processing involves conventional aqueous treatments. Other addition polymers have to some extent the same disadvantage. Thus, the dyeing of acrylonitrile homopolymer fibers is attended with considerable difficulty.

U. S. Patent 2,491,471 discloses a solution, albeit not a complete one, of this difficulty. This patent discloses that copolymers of acrylonitrile with small proportions of the vinylpyridines are readily dyeable and can be processed by the normally used aqueous processing treatments in the film, and particularly the fiber industries. In contrast, the corresponding acrylonitrile homopolymer is difficultly dyeable and not readily handleable by the normal processing treatments. However, these acrylonitrile/vinylpyridine copolymers, although more amenable to the usual dyeing and processing conditions, do not exhibit the desirable, high thermal insensitivity of the acrylonitrile homopolymers.

Another solution, still not a complete one, is disclosed in the copending application of Barney, Ser. No. 216,838, filed March 21, 1951. This discloses that copolymers of acrylonitrile with certain simple vinylidene quaternary ammonium compounds are readily dyeable and handleable in aqueous systems but exhibit an inertness somewhat less than that of acrylonitrile homopolymers. Thus, even these desirable copolymers do not exhibit the outstanding thermal insensitivity of the acrylonitrile homopolymers.

U. S. Patents 2,572,560 and 2,572,561 disclose copolymers of acrylonitrile with vinyl and allyl esters containing quaternary ammonium halide groups.

Other polymers having recurring extralinear quaternary ammonium salt groups, wherein the anion is that of a simple acid, i. e., a non-complex acid, are disclosed in U. S. Patents 2,540,985, 2,487,829, 2,484,420, 2,484,430, 2,138,763.

This invention has as an object the preparation of copolymers of low thermal and hydrolytic sensitivities which also exhibit adequate response to aqueous processing treatments. Another object is the preparation of acrylonitrile copolymers. A further object is the preparation of new polymers. Another object is the provision of a new treatment process for polymers in extended form. Other objects will appear hereinafter.

These objects are accomplished by the present invention of resinous addition polymers having a wholly carbon polymer chain and containing extralinear quaternary ammonium polytungstate groups, i. e., resinous addition polymers having extralinear quaternary ammonium nitrogens bonded to a polytungstate anion, of a process therefor wherein a resinous addition polymer containing extralinear quaternary ammonium salt groups, the salt being of a simple acid, are reacted with a soluble polytungstate whereby the salt of the polytungstic acid with the quaternary ammonium polymer is formed. These polymers are readily dyeable and handleable by normally used aqueous processing treatments and at the same time are quite low in thermal sensitivity. In this new class of polymers the quaternary ammonuim polytungstate groups are present as extralinear components "on" and not "in" the polymer chain.

A particularly preferred class of this polymeric extralinear quaternary ammonium polytungstates are those wherein the quaternary ammonium nitrogen of the cation of the polytungstate is bonded, either directly or mediately, through a negative, i. e., electron-attractive group (including nuclear carbon of an aromatic heterocyclic ring), to the polymer chain.

In the quaternary ammonuim polytungstates of this invention the valences of the quaternary ammonium nitrogen not bonded as above to the polymer chain or to the polytungstate anion are satisfied by hydrocarbon radicals whose free valences are all attached to the quaternary ammonium nitrogen. Thus a divalent radical has both of its valences joined to the nitrogen forming therewith a heterocyclic ring.

The most readily available and therefore more important classes of quaternary ammonium polytungstates of this invention are those wherein recurring extralinear quaternary pyridinium polytungstate groups, hydrocarbon except for the polytungstate anion and the pyridinium nitrogen, are joined to the polymer chain by carbon of the pyridinium ring and those wherein recurring extralinear quaternary ammonium polytungstate groups are bonded from the nitrogen to the alkylene, —R—, radical of a group —[CO]$_n$OR—, wherein $n$ is a cardinal number not greater than one, and thence to the polymer chain, the extralinear quaternary ammonium substituent on the polymer chain being hydrocarbon except for the nitrogen, the polytungstate anion and the —[CO]$_n$O— group. The polymers may also contain similar quaternary ammonium polymer units with however the nitrogen bonded ionically to the anion of a simple mono-, di-, or tribasic acid, organic or inorganic, rather than to the anion of the complex polytungstic acid.

In the new polymers of this invention the quaternary ammonium polytungstate groups are extralinear components "on" rather than "in" the polymer chain, with the quaternary nitrogens of the polytungstate group bonded directly through a hydrocarbon chain or a hydrocarbon chain interrupted by an oxy (ether or ester) group to the wholly carbon chain of the polymer with the remaining valences of the quaternary nitrogen satisfied by monovalent hydrocarbon radicals. The radicals bonded to the extralinear quaternary ammonium nitrogen as well as the one joining the quaternary ammonium nitrogen to the main polymer chain are free of aliphatic unsaturation. The characteristic recurring units of the new polymers of this invention are conviently represented in combined form by the following structural formula

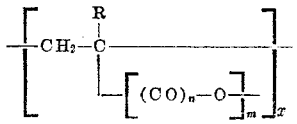

wherein R is hydrogen or a monovalent hydrocarbon radical free from aliphatic unsaturation and preferably saturated aliphatic hydrocarbon of no more than four carbons, i. e., lower alkyl hydrocarbon, and $n$ and $m$ are cardinal numbers no greater than 1 and may be alike or different with the single indicated terminal free valence on the

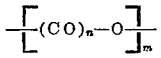

group being bonded through a hydrocarbon chain free from aliphatic unsaturation to a quaternary ammonium nitrogen atom, one valence of which is singly ionically bonded to the anion of a polytungstic acid, the remaining valences of the said quaternary ammonium nitrogen being satisfied by monovalent hydrocarbon radicals free of aliphatic unsaturation and usually of no more than six carbons apiece, any two of which can be together joined to form with the quaternary ammonium nitrogen a heterocycle, and $x$ is used to indicate the degree of polymerization. The preferred polymers of this invention will contain in combined form such recurring units wherein $n$ and $m$ are as given above, R is hydrogen or a short-chain, saturated aliphatic hydrocarbon radical, i. e., lower alkyl of from 1 to 4 carbons, and the indicated free valence of the

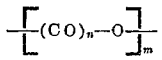

group is directly bonded through a single hydrocarbon radical of from 2 to 6 carbons, free of both Zerewitinoff active hydrogen and aliphatic unsaturation and of at least two carbons between the free valences, and most preferably a saturated hydrocarbon radical of from 2 to 6 carbons, to a quaternary ammonium nitrogen atom, one valence of which is singly bonded ionically in multiples of one to six, usually one to three, to the anion of a polytungstic acid with the remaining valences of the said quaternary ammonium nitrogen being satisfied by monovalent hydrocarbon radicals free from aliphatic unsaturation and of no more than eight carbons apiece, and most preferably by saturated aliphatic, hydrocarbon radicals of no more than four carbons apiece, any two of which can be together joined to form with the said quaternary ammonium nitrogen atom a saturated nitrogen heterocycle, i. e., a piperdyl heterocycle.

The polymeric quaternary ammonium polytungstates of this invention not only include those polymers wherein each combined unit contains an extralinear quaternary ammonium nitrogen, bonded as previously described in multiples of from one to six to polytungstic acid anions, but also those which contain in combined form, in addition to the recurring quaternary ammonium polytungstate units, units of other addition polymerizable monomers, e. g., the mono and diene monomers. For the more important uses the polymer should be wholly of monoethenoid monomers, i. e., monomers having but one aliphatic unsaturation and that ethylenic and preferably terminally ethylenic. To attain the relatively high thermal stability evidenced by this new class of polymers, there must be present in the polymer chain at least 0.023% and preferably at least 0.15% by weight of the polymer of units containing the extralinear quaternary ammonium polytungstate anions, i. e., the polymers of this invention must contain at least 0.015% and preferably at least 0.1% combined tungsten by weight.

The following examples in which parts are by weight are illustrative of the invention.

In these examples the inherent viscosity data given are obtained at 25° C. with dimethylformamide solutions of the polymer involved at a concentration of 0.2 g. of polymer per 100 cc. of solution.

EXAMPLE I

A. *Preparation of 1,2-dimethyl-5-vinylpyridinium p-toluenesulfonate*

A mixture of 23.8 parts of 2-methyl-5-vinylpyridine and 37.2 parts of methyl p-toluenesulfonate is dissolved in 51.5 parts of acetone and the resulting solution allowed to stand overnight at room temperature. The white crystalline product thus obtained is removed by filtration, washed well with anhydrous ether, and dried under reduced pressure. There is thus obtained 45 parts of 1,2-dimethyl-5-vinylpyridinium p-toluenesulfonate. This product, after recrystallization from a 1:2 by volume mixture of ethanol and ethyl acetate, exhibits a melting point of 142° C.

B. *Preparation of an acrylonitrile/1,2-dimethyl-5-vinylpyridinium p-toluenesulfonate copolymer*

A solution of 6.29 parts of potassium in dihydrogen phosphate in 3500 parts of distilled water in a reaction vessel fitted for efficient agitation is adjusted to pH 7.0 by the addition of 0.5 N-aqueous sodium hydroxide solution. To this solution is added 240 parts of freshly distilled acrylonitrile, 12.65 parts of 1,2-dimethyl-5-vinylpyridinium p-toluenesulfonate and 3.48 parts of thiourea. The temperature of the mixture is then adjusted to 25° C. and 104.5 parts of fresh 3% aqueous hydrgen peroxide is added under an atmosphere of nitrogen and the resulting mixture then agitated for three hours while maintaining the temperature at 25° C. The resulting white solid is removed from the polymerization mixture by filtration and washed well with distilled water, then with methanol containing about 0.4% p-toluenesulfonic acid, and finally with excess methanol, all while on the filter. After drying under reduced pressure at 60° C. there is thus obtained 165 parts of a 95/5 acrylonitrile/1,2-dimethyl - 5 - vinylpyridinum p-toluenesulfonate copolymer exhibiting an inherent viscosity of 2.01.

C. *Preparation of acrylonitrile/1,2-dimethyl-5-vinylpyridinium p - toluenesulfonate/1,2 - dimethyl - 5 - vinylpyridinium phosphotungstate copolymers*

A self-supporting film of the 95/5 acrylonitrile/1,2-dimethyl-5-vinylpyridinium p-toluenesulfonate copolymer described above in part B is prepared by solvent casting from dimethylformamide solution. A sample of this film is boiled for one-half hour in a 1% aqueous solution of sodium phosphotungstate at pH=2.35. The resulting quternary copolymer containing combined acrylonitrile, 1,2-dimethyl-5-vinylpyridinium p-toluenesulfonate and 1,2-dimethyl-5-vinylpyridinium phosphotungstate units exhibits excellent thermal stability after soap washes. For instance, samples of this film after boiling in 0.5 aqueous soap solution for ½ hour remain water-white with no evidence of thermal decomposition after baking at 165° C. for 20 minutes. In contrast, samples of the starting acrylonitrile/1,2-dimethyl-5-vinylpyridinium p-toluenesulfonate copolymer turned dark orange-brown under the same conditions.

Another film sample of the starting 95/5 acrylonitrile/1,2 - dimethyl-5-vinylpyridinium p-toluenesulfonate copolymer is boiled for ½ hour in an aqueous 10% phosphotungstic acid solution the pH of which has been adjusted from the original 0.9 to 2.0 by the addition of aqueous sodium hydroxide. There is thus obtained a 94.0/4.6/1.4 acrylonitrile/1,2-dimethyl-5-vinylpyridinium p-toluenesulfonate/1,2-dimethyl-5-vinylpyridinium phosphotungstate copolymer which exhibits similar excellent thermal resistivity, remaining water-white after baking at 165° C. for twenty minutes subsequent to a ½ hour boil in 0.5% aqueous soap solution.

This ternary copolymer is found by analysis to contain 0.97% tungsten. Since each phosphotungstate anion in known monomeric quaternary phosphotungstate salts is bonded to three quaternary ammonium nitrogens, this 0.97% tungsten content indicates that about 8% of the available basic nitrogen sites in the starting two-component copolymer have been converted to quaternary phosphotungstates. Thus the product is a 94.0/4.6/1.4 acrylonitrile/1,2 - dimethyl-5-vinylpyridinium p - toluenesulfonate/1,2-dimethyl-5-vinylpyridinium phosphotungstate copolymer. In such a copolymer the phosphotungstate anion bonded to the three quaternary nitrogens would be of the following formula:

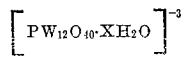

or the dimer

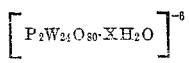

Another film sample of the starting 95/5 acrylonitrile/1,2-dimethyl-5-vinylpyridinium p-toluenesulfonate copolymer is boiled for one minute in an aqueous 10% phosphotungstic acid solution at pH 2.0. After washing and drying the ternary copolymer is found by analysis to contain 0.018% tungsten, i. e., the product is a 94.981/4.992/0.027 acrylonitrile/1,2-dimethyl-5-vinylpyridinium p - toluenesulfonate/1,2 - dimethyl-5-vinylpyridinium phosphotungstate copolymer. After boiling for ½ hour in aqueous 0.5% soap solution followed by baking for 20 minutes at 165° C. a film of this copolymer exhibited some evidence of thermal decomposition, being light yellow in color, but appreciably less so than a film of the starting two component copolymer which under like conditions turns a dark orange-brown.

D. *Preparation of dyed ternary copolymer films by after-treatment of starting binary quaternary polymers*

Film samples of the 95/5 acrylonitrile/1,2-dimethyl - 5 - vinylpyridinium p-toluenesulfonate copolymer described previously in Example I, part B are dyed by boiling for half an hour in various dye baths made up from 1,000 parts of distilled water adjusted to pH 6.0 with dilute acetic acid and two parts of representative dyes including a blue anthraquinone dye whose recognized foreign prototype is Alizarin Supra Blue A, a violet anthraquinone dye of Colour Index No. (CIN) 1080, and an orange acid dye of CIN 161. The deeply dyed film samples are then heated at the boil for ten minutes in a 10% aqueous phosphotungstic acid solution adjusted to pH 2.0 with dilute aqueous sodium hydroxide. The dyed ternary acrylonitrile/1,2-dimethyl-5-vinylpyridinium p-toluenesulfonate/1,2 - dimethyl-5-vinylpyridinium phosphotungstate copolymer films are then boiled for half an hour in 0.5% aqueous soap solution, during which process essentially no color is removed. Baking of the washed films for twenty minutes at 165° C. gives no evidence of thermal decomposition. The dyed films retain their initial shades. In contrast, samples of the starting 95/5 acrylonitrile/1,2-dimethyl-5-vinylpyridinium p-toluenesulfonate copolymers, when dyed in the same dye baths and soaped and baked in the same fashion, all give evidence of deep-seated thermal decomposition, with the shades in all instances being appreciably darkened and in some cases completely changed, for instance the blue dyed films turn green.

A film sample of the three component copolymer containing only 0.018% tungsten described above in Example I, Part C when dyed in the manner given above with the blue anthraquinone dye is dyed a fast, deep blue. After being boiled for half an hour in aqueous 0.5% soap solution and then baked at 165° C. for twenty minutes the dyed film exhibits no evidence of thermal decomposition, the blue shade remaining unchanged. In contrast, as pointed out previously, samples of the original two component copolymer similarly treated show clear evidence of deep seated thermal decomposition.

EXAMPLE II

*Preparation of an acrylonitrile/1,2-dimethyl-5-vinylpyridinium p - toluenesulfonate/1,2 - dimethyl-5-vinylpyridinium tungstate*

A sample of the acrylonitrile/1,2-dimethyl-5-vinylpyridinium p-toluenesulfonate copolymer described above previously in Example I, part B is prepared in film form by solvent casting from dimethylformamide solution. This strong, clear, self-supporting film is heated for thirty minutes at the boil in a 10% aqueous polytungstic acid solution prepared by adjusting the pH of a 10% aqueous sodium tungstate solution to 2.0 with dilute hydrochloric acid. The treated film is removed from the polytungstic acid solution and dried, and subsequently boiled in 0.5% aqueous soap solution for half an hour. The film, after being baked at 165° C. for twenty minutes, still remains water-clear, with no signs of thermal decomposition. In contrast, a control film of the starting two-component copolymer turns deep orange-brown in the baking cycle after the soap wash. Other experiments similarly carried out show that the quaternary tungstate copolymers can be readily prepared by similar treatments at any pH below 3.0, with the preferred pH range being from 1.5 to 2.5.

EXAMPLE III

A. *Preparation of an acrylonitrile/2-vinyloxyethyltrimethylammonium chloride copolymer*

This copolymer is prepared in exactly the same manner as that described in Example I, part B, substituting 2-vinyloxyethyltrimethylammonium chloride for the 1,2-dimethyl-5-vinylpyridinium p-toluenesulfonate used there and using only half the quantities of thiourea and hydrogen peroxide. There is thus obtained 207 parts of a 95/5 acrylonitrile/2-vinyloxyethyltrimethylammonium chloride copolymer exhibiting an inherent viscosity of 2.44.

B. *Preparation of an acrylonitrile/2-vinyloxyethyltrimethylammonium chloride/2-vinyloxyethyltrimethylammonium phosphotungstate copolymer*

A sample of the 95/5 acrylonitrile/2-vinyloxyethyltrimethylammonium chloride copolymer described above in Example III, part A is prepared in film form by solvent casting from dimethylformamide solution. The strong, clear, self-supporting film thus obtained is boiled for ten minutes in a 10% aqueous solution of phosphotungstic acid with the pH adjusted to 1.8 by addition of dilute sodium hydroxide solution. The film of the acrylonitrile/2-vinyloxyethyltrimethylammonium chloride/2 - vinyloxyethyltrimethylammonium phosphotungstate copolymer thus obtained after boiling for half an hour in an aqueous 0.5% soap solution exhibits no sign of thermal decomposition after twenty minutes at 165° C. In contrast, a film of the starting 95/5 acrylonitrile/2 - vinyloxyethyltrimethylammonium chloride copolymer turns deep orange-brown when subjected to the same wash and bake cycle.

EXAMPLE IV

A. *Preparation of beta-methacrylyloxyethyltrimethylammonium p-toluenesulfonate*

To a cooled (ice/water bath) solution of freshly distilled dimethylaminoethyl methacrylate in 71.4 parts of anhydrous ether is added slowly under anhydrous conditions a solution of 18.6 parts of methyl p-toluenesulfonate in 28.5 parts of anhydrous ether. The reaction mixture is allowed to stand at approximately 4° C. for four days under anhydrous conditions in an atmosphere of nitrogen. The resulting white, crystalline solid thus obtained is removed by filtration under anhydrous conditions and dried under reduced pressure at room temperature. There is thus obtained 26.6 parts of beta-methacrylyloxyethyltrimethylammonium p-toluenesulfonate.

B. *Preparation of an acrylonitrile/beta-methacrylyloxyethyltrimethylammonium p - toluenesulfonate copolymer*

This copolymer is prepared as described previously in Example I, part B, substituting 12.0 parts of the above-described beta-methacrylyloxyethyltrimethylammonium p-toluenesulfonate for the 12.65 parts of 1,2 - dimethyl-5-vinylpyridinium p-toluenesulfonate. There is thus obtained 153 parts of a 95.2/4.8 acrylonitrile/beta-methacrylyloxyethyltrimethylammonium p-toluenesulfonate copolymer as a white powder exhibiting an inherent viscosity of 2.05.

C. *Preparation of an acrylonitrile/beta-methacrylyloxyethyltrimethylammonium p - toluenesulfonate/beta - methacrylyloxyethyltrimethylammonium phosphotungstate copolymer*

A sample of the 95.2/4.8 acrylonitrile/beta-methacrylyloxyethyltrimethylammonium p-toluenesulfonate copolymer described above in Example IV, part B is solvent cast from dimethylformamide solution to give a clear, strong, self-supporting film. A sample of this film is heated for ten minutes at the boil in a 10% aqueous phosphotungstic acid solution with the pH adjusted to 2.0 by the addition of aqueous sodium hydroxide solution. The ternary copolymer film thus obtained, after washing and drying, is found to contain 1.06% tungsten. This indicates that the ternary copolymer is a 94.2/4.2/1.6 acrylonitrile/beta - methacrylyloxyethyltrimethylammonium p - toluenesulfonate/beta-methacrylyloxyethyltrimethylammonium phosphotungstate copolymer. Film samples of this copolymer, after boiling for half an hour in an aqueous 0.5% soap solution, exhibit no thermal decomposition when heated for twenty minutes at 165° C. In contrast, a film of the starting 95.2/4.8 acrylonitrile/beta - methacrylyloxyethyltrimethylammonium p-toluenesulfonate copolymer turns dark orange-brown when subjected to the same treatment.

A sample of this ternary copolymer film is boiled for one and one-half hours in a solution of 0.2 part of a blue anthraquinone dye whose recognized foreign prototype is Alizarin Supra Blue A in 100 parts of distilled water adjusted to pH 6.0 with acetic acid. At the end of this dyeing cycle the film is richly colored a deep blue. The dyed film is boiled for half an hour in an aqueous 0.5% soap solution, during which time very little, if any, of the color is washed out. This dyed and washed film sample gives no evidence of thermal decomposition after being heated at 165° C. for twenty minutes. In contrast, samples of the control 95.2/4.8 acrylonitrile/beta - methacrylyloxyethyltrimethylammonium p-toluenesulfonate copolymer, although dyeing to deep, fast shades, after undergoing the same wash and baking cycle are dark green-blue with evidence of thermal decomposition.

Similar results are obtained with another sample of this same type three component copolymer prepared by treating another film sample of the 95.2/4.8 acrylonitrile/beta-methacrylyloxyethyltrimethylammonium p - toluenesulfonate copolymer for only three minutes at the boil with an aqueous 10% phosphotungstic acid solution at pH 2.0. The three component quaternary copolymer thus obtained, after washing and drying, is found by analysis to contain 0.46% tungsten, from which it is calculated that the ternary copolymer is a 94.8/4.5/0.7 acrylonitrile/beta-methacrylyloxyethyltrimethylammonium p-toluenesulfonate/beta - methacrylyloxyethyltrimethylammonium phosphotungstate copolymer.

A film sample of this copolymer is easily dyed in half an hour at the boil to a deep blue shade using a dye bath containing 0.2 part of the previously mentioned blue anthraquinone dye in a solution of 15 parts of ammonium acetate in 100 parts of water with the pH adjusted to 6.0 with acetic acid and then to 3.0 with hydrochloric acid. This dyed film shows no color change or other evidence of thermal decomposition when baked for twenty minutes at 165° C. after having been soaped for half an hour at the boil in an 0.5% aqueous soap solution. In contrast, film samples of the starting two component copolymer turn dark blue-green when similarly soaped and baked after having been dyed. This copolymer containing the lower percentage of combined tungsten (0.46%) seems as stable thermally as the one described earlier in this example containing the higher percentage of combined tungsten (1.06%) and furthermore is more easily dyed. See also Example I, part C. Copolymers containing such lower percentages of combined tungsten, e. g., from as low as 0.05 to 0.75% tungsten are preferred.

EXAMPLE V

*Preparation of an acrylonitrile/beta-methacrylyloxyethyltrimethylammonium p-toluenesulfonate/beta - methacrylyloxyethyltrimethylammonium silicotungstate copolymer*

A sample of the 95.2/4.8 acrylonitrile/beta-methacrylyloxyethyltrimethylammonium p-toluenesulfonate copolymer described above in Example IV, part B, is obtained in film form by solvent casting from dimethylformamide solution. The clear, strong, self-supporting film thus obtained is heated for ten minutes at the boil in a 10% aqueous silicotungstic acid solution with the pH adjusted to 0.5 by the addition of a small amount of concentrated hydrochloric acid. The acrylonitrile/beta - methacrylyloxyethyltrimethylammonium p - toluenesulfonate/beta - methacrylyloxyethyltrimethylammonium silicotungstate copolymer thus obtained, after boiling for half an hour in 0.5% soap solution, gives no evidence of thermal decomposition after heating for twenty minutes at 165° C. In contrast, a film sample of the starting acrylonitrile/beta-methacrylyloxyethyltrimethylammonium p - toluenesulfonate copolymer turns deep orange-brown when subjected to the same wash and bake.

EXAMPLE VI

A. *Preparation of poly beta-methacrylyloxyethyltrimethylammonium methylsulfate*

A solution of 167 parts of freshly redistilled beta-dimethylaminoethyl methacrylate in 200 parts of methyl ethyl ketone is added with vigorous stirring over a period of one hour at ice bath temperature to a solution of 126 parts of freshly redistilled dimethyl sulfate in 800 parts of methyl ethyl ketone. The resultant reaction mixture is allowed to stand in an ice/water bath overnight and the solid white crystalline product removed by filtration and dried under reduced pressure. There is thus obtained 260 parts (92% of theory) of beta-methacrylyloxyethyltrimethylammonium methylsulfate. This monomer is dissolved in 1500 parts of distilled water at 60° C. under an atmosphere of nitrogen and one part of alpha,-alpha'-azobis(isobutyramidine hydrochloride) is added with stirring. The solution becomes viscous in about fifteen minutes and the polymerization is continued at 60° C. for five hours. The resultant polymer solution is evaporated to dryness in an oven at 90° C. and the glassy polymer thus obtained then pulverized with water in a high-speed mechanical stirrer, isolated by filtration and redried. There is thus obtained 240 parts (about 85% conversion) of beta-methacrylyloxyethyltrimethylammonium methylsulfate polymer.

B. *Preparation of poly - beta - methacrylyloxyethyltrimethylammonium phosphotungstate*

To a freshly filtered solution of ten parts of the above-described poly-beta-methacrylyloxyethyltrimethylammonium methylsulfate in about 300 parts of distilled water is added a solution of 56.5 parts (about 1.5 molar proportions based on the quaternary methylsulfate polymer) of phosphotungstic acid (molecular weight 6160) in about 500 cc. of distilled water. A white solid product separates at once and is removed by suction filtration and washed on the filter with excess water. After drying under reduced pressure in the presence of anhydrous phosphorus pentoxide, there is thus obtained 36.2 parts (about 95% of theory) of poly-beta-methacrylyloxyethyltrimethylammonium phosphotungstate as a white powdery solid.

*Analysis*

Calculated for $C_{27}H_{54}O_{46}N_3PW_{12}\cdot 2H_2O$: N, 1.227%; W, 64.5%.
Calculated for $C_{27}H_{54}O_{46}N_3PW_{12}\cdot 3H_2O$: N, 1.22%; W, 64.0%.
Found: N, 1.18%, 1.15%; W, 64.04%, 64.48%.

EXAMPLE VII

A. *Preparation of a vinyl acetate/beta-methacrylyloxyethyltrimethylammonium methylsulfate copolymer*

A polymerization reactor is charged with 16 parts of vinyl acetate, 4 parts of beta-methacrylyloxyethyltrimethylammonium methylsulfate, about 85 parts of tertiary butanol, and 0.2 part of alpha,alpha'-azodiisobutyronitrile. The polymerization mixture heated at 60° C. for ten hours under an atmosphere of nitrogen. After removing the tertiary butanol by distillation under reduced pressure, there is thus obtained 18.1 parts of an 80/20 vinyl acetate/beta-methacrylyloxyethyltrimethylammonium methylsulfate copolymer as a fibrous, slightly hydroscopic, amorphous powder soluble in methanol from which solution self-supporting films can be solvent cast. The copolymer exhibits in this solvent an inherent viscosity of 1.62 at a concentration of 0.2 part of polymer per 100 cc. of solution at 25° C.

*Analysis*

Calculated for 80% $C_4H_6O_2$/20% $C_{10}H_{21}O_6SN$: N, 0.99%. Found: N, 0.98%.

B. *Preparation of a vinyl acetate/beta-methacrylyloxyethyltrimethylammonium phosphotungstate copolymer*

To a solution of 3.5 parts of the above-described 80/20 vinyl acetate/beta-methacrylyloxyethyltrimethylammonium methylsulfate copolymer in about 75 parts of C. P. methanol is added with stirring a solution of four parts (about 1.5 molar proportion based on the quaternary methylsulfate copolymer) of phosphotungstic acid in about 7.5 parts of C. P. methanol. A small amount of white solid precipitates at once. Approximately 75% of the methanol is removed from the reaction mixture by distillation under reduced pressure and approximately 100 parts of distilled water then added. The white solid product thereby obtained is separated by centrifuging, washed thoroughly with excess water and finally separated again in a centrifuge. After drying there is thus obtained 1.8 parts (about 50% lost by spillage) of a vinyl acetate/beta-methacryloyloxyethyltrimethylammonium phosphotungstate copolymer as an off-white powder from which heat- and wash-stable, self-supporting films can be cast.

The present invention is generic to addition polymers, including copolymers, having a wholly carbon polymer chain and containing recurring extralinear quaternary ammonium polytungstate groups. In the new polymers of this invention the quaternary ammonium nitrogen is ionically bonded to the polytungstic acid anion, is bonded to the carbon chain of the polymer through a negative, i. e., electronegative, i. e., electronattractive group, including nuclear carbon of an aromatic ring, and has a remaining valence bonded to the positive organic radical, usually alkyl, of a quaternizing agent. The extralinear quaternary ammonium polytungstate substituent contains only carbon, hydrogen, oxygen, the quaternary nitrogen, and the metals of the polytungstate anion.

Preferred polymers are those wherein the recurring quaternary ammonium nitrogens are a) those of an N-alkylpyridinium nucleus, hydrocarbon except for the pyridinium nitrogen and bonded from ring carbon directly to the polymer chain, and b) those wherein a trialkylammonium nitrogen is bonded through the alkylene, —R—, radical of a group RO[CO]n—, where n is a cardinal number not greater than one, to the polymer chain. The polymers of the present invention all contain a plurality of recurring extralinear quaternary ammonium polytungstate groups with one valence of each of the nitrogens of said groups bonded to the main polymer chain through a multiply bonded carbon, including the carbons of an aromatic ring such as the pyridinium ring or through, either directly or mediately, an ether oxygen or an ester linkage, either as a carbonyloxy or oxycarbonyl linkage.

The extralinear quaternary ammonium nitrogens each have a valence ionically bonded singly in multiples of from one to six to the anion of a polytungstic acid. The remaining three valences of each of the quaternary nitrogens in the extralinear ammonium polytungstate units are satisfied by organic radicals, preferably hydrocarbon radicals, of one to eight carbons, with usually at least two of said three valences being satisfied by hydrocarbon radicals of one to eight carbons, which may be together joined to form with the said quaternary ammonium nitrogen a ring. Generally these said three valences of the extralinear quaternary ammonium nitrogens will be satisfied by solely hydrocarbon radicals having a total of three to twelve carbons and preferably saturated aliphatic hydrocarbon radicals of a total of from three to nine carbons, with the lower (one to two carbon) saturated aliphatic hydrocarbon radicals being particularly useful. Particularly useful are the polymers wherein the nitrogen is bonded to the polytungstate ion, to the polymer chain through a) an oxyalkylene radical or b) a carboxyalkylene radical, or c) pyridinium ring carbon, any remaining valences of the nitrogen being satisfied by alkyl radicals of up to four carbons. Thus, the recurring quaternary ammonium polytungstate nitrogens can be joined to the $C_nH_{2n}$ radical of a —(CO)$_m$OC$_n$H$_{2n}$— group wherein $m$ is a cardinal number not greater than 1 and $n$ is an integer from one to six, the other valences of the nitrogen being satisfied by monovalent hydrocarbon radicals of a total of three to twelve carbons. In the remaining class the quaternary nitrogen is that of an N-alkylpyridinium nucleus, hydrocarbon except for the nitrogen and bonded from carbon of the nucleus to carbon of the wholly carbon polymer chain.

The polymeric extralinear quaternary ammonium polytungstates of this invention, wherein in each instance the extralinear quaternary nitrogens are bonded as described previously to a polytungstic acid anion, include those polymers wherein the extralinear quaternary nitrogen is bonded to the main polymer chain through a carbon free of aliphatic unsaturation but carrying a multiple linkage, including an aromatic ring linkage, e. g., where the extralinear quaternary radical is the N-methylpyridinium radical; those polymers wherein the extralinear quaternary nitrogen is bonded to the main polymer chain through an ether linkage, e. g., where the extralinear quaternary radical is the dimethylcyclohexylammoniumethyloxy radical; and those polymers wherein the extralinear quaternary nitrogen is bonded to the main polymer chain through an ester linkage including both an oxycarbonyl and a carbonyloxy linkage, e. g., where the extralinear quaternary ammonium radicals are the diethylbenzylammoniumethyloxycarbonyl radical or the trimethylammoniumethylcarbonyloxy radical.

The polytungstic acids which form the anions of the combined quaternary ammonium polytungstate units in the polymers of the present invention include both the isopoly- and the heteropolytungstic acids. These polytungstic acids, like other weak acids formed from the amphoteric metals of groups V—A and VI—A of the periodic table, are characterized by the ease with which they condense to form anions containing several acid anhydride molecules. Condensed acids containing only one type of acid anhydride are known as the isopoly acids, in the present instance isopolytungstic acid. Condensed acids containing acid anhydrides of two acid forming metals are termed heteropolyacids, in the present instance the heteropolytungstic acids, wherein usually only one molecule of the other acid anhydride is involved, which, see Ephraim—Anorganische Chemie (Steinkopf, Dresden, 1934) page 426 et seq, furnishes the central atom or central anion of the whole complex anion. While elements of all eight groups of the periodic table have been reported as capable of furnishing various acid anhydride molecules to serve as the central ion in the formation of a complex heteroacid anion, the present invention is primarily concerned, in addition to the isopolytungstic acids, with the heteropolytungstic acids wherein the central acid anhydride molecule is formed from an element of groups IV and V of the periodic table. Thus, the invention includes not only the isopolytungstates but also the silicotungstates, the phosphotungstates, and the like. Because of their greater availability isopolytungstic and phosphotungstic acids are preferred. Of these, the latter is available commercially and for this reason, and also because it contributes slightly better thermal stability properties to the polymers and can be applied from slightly less strongly acidic solution thereby causing less possible polymer hydrolysis, phosphotungstic acid is the most preferred polytungstic acid.

The poly-acid field is complex and is in a state of development. Their specific molecular structure and degree of hydration are therefore as yet not finally clarified. However, this specification uses the generally recognized mode of formulation of the isopolytungstic and heteropolytungstic acids, e. g., for isopolytungstic acid $$H_6[H_2O_4W_{12}O_{18}(OH)_{36}]$$

and for the heteropolyacids, wherein there are combined six to twelve $WO_3$ groups for each anion of the parent acid, e. g., $$H_3PW_{12}O_{40} \cdot XH_2O$$

or $$H_6P_2W_{24}O_{80} \cdot XH_2O$$

In the examples used to illustrate this invention the calculations are based on the most generally accepted view that each molecule of the polytungstic acids is bonded to three quaternary nitrogens in the formation of the quaternary ammonium polytungstate salts. However, the invention is generic to quaternary ammonium polymers wherein from one to six quaternary ammonium nitrogens are bonded to each polytungstate anion.

In those instances where one or two quaternary ammonium nitrogens of the polymer are bonded to each polytungstate anion, there will be acidic hydrogens ionically bonded to the polytungstate anion. Typical such anions are $$[H_2PW_{12}O_{40} \cdot XH_2O]^{-1}$$

or $$[H_4P_2W_{24}O_{80} \cdot XH_2O]^{-2}$$

In those instances where three quaternary ammonium nitrogens of the polymer are bonded to each polytungstate anion, the anions will usually be in the so-called monomeric form, i. e., of the $$[PW_{12}O_{40} \cdot XH_2O]^{-3}$$

type. However, such anions may be in the so-called dimeric aggregate form, e. g., $$[H_3P_2W_{24}O_{80} \cdot XH_2O]^{-3}$$

In those instances where four, five, or six quaternary nitrogens of the polymer are bonded to each polytungstate anion, the said anions will be in the higher aggregate form wherein six acidic hydrogens are available, and depending upon how many quaternary nitrogens are ionically bonded to the said anion, there may be two, one, or none of the acidic hydrogens ionically bonded to the said anions, e. g., $$[H_2[H_2O_4W_{12}O_{18}(OH)_{36}]]^{-4}$$

or $$[HP_2W_{24}O_{80} \cdot XH_2O]^{-5}$$

or $$[H_2O_4W_{12}O_{18}(OH)_{36}]^{-6}$$

The polymers of the present invention can contain, in combination, in addition to the units carrying the extralinear quaternary ammonium polytungstate group, units of any other addition polymerizable monomer. Thus, for instance, these polymers may contain in combination, units of addition polymerizable monomers having one ethylenic unsaturation, e. g., olefins, e. g., isobutylene; acrylyl and alkacrylyl compounds, e. g., acrylic, haloacrylic, and methacrylic acids, esters, nitriles, and amides, e. g., acrylonitrile, butyl acrylate, methacrylic acid, alpha-chloroacrylic acid, the aminoalkyl acrylates, e. g., beta-diethylaminoethyl methacrylate; vinyl and vinylidene halides, e. g., vinyl fluoride, vinylidene chloride; vinyl carboxylates, e. g., vinyl acetate; vinyl aryls, e. g., styrene; and other vinyl derivatives, e. g., methyl vinyl ketones, vinylpyridines, vinyl isobutyl ethers and the like. The polymers of the present invention can also contain, in combination, units of polymerizable compounds containing a plurality of ethylenic double bonds including those having conjugated double bonds which are furthermore both terminal ethylenic double bonds such as butadiene, 2-chlorobutadiene, and compounds containing two or more ethylenic double bonds which are isolated with respect to each other, including, for instance, the acrylic and substituted acrylic esters of polyhydric alcohols, e. g., ethylene glycol dimethacrylate; polymerizable compounds having one ethylenic group conjugated with a carboxylic group, e. g., diallyl maleate, and compounds which have no conjugation of the polymerizable ethylenic groups, e. g., divinyl succinate. The preferred copolymers of this invention are those containing in addition to the extralinear polytungstate units in combined form those addition polymerizable monomers having a single terminal methylene group joined by an ethylenic double bond to its neighboring carbon, i. e., compounds containing the terminal group $CH_2=C<$.

Because of the excellent over-all film and fiber properties they exhibit, the acrylonitrile/quaternary ammonium polytungstate copolymers and the preparation of such copolymers by the treatment with polytungstates of films and fibers of acrylonitrile/quaternary ammonium copolymer salts of simple acids constitute the most preferred form of this invention. These copolymers will usually contain at least 85% combined acrylonitrile and at least 0.015% combined tungsten with the remainder of the copolymer being the combined quaternary ammonium radical carrying the polytungstate and other combined addition polymerizable monomers as described above, particularly those containing basic groups. Although higher amounts of combined tungsten may be present, these preferred copolymers will seldom have more than about 2.0% combined tungsten since above this level not much improvement in thermal resistivity is attained and such polymers obviously are more expensive. As is true of all the polymers of this invention the most preferred of these acrylonitrile/quaternary ammonium polytungstate copolymers will contain from 0.05 to 1.0% and usually from 0.1 to 0.75% combined tungsten. As the amount of combined acrylonitrile is increased, e. g., to 90 or 95%, the preferred acrylonitrile/quaternary ammonium polytungstates become more thermally insensitive.

The polymers of the present invention are usually most conveniently prepared by treating with an aqueous solution of the desired polytungstic acid a polymer of the desired structure having extralinear quaternary ammonium nitrogen groups which are singly bonded ionically in multiples of one to three to anions of the simple acids, including the mono-, di-, and tribasic acids. The term "simple acids" is used as in the Rules for Inorganic Nomenclature (J. Am. Chem. Soc. 63 889 et seq. (1941)) in contrast to the polyacids. Anion interchange by treatment with the aqueous solution of the polytungstic acid may be carried out at temperatures ranging from room temperature to 100° C. for periods of time ranging from as short as thirty seconds to as long as twenty-four hours or longer, and is in all instances preferably carried out at pH's in the range 0.1 to 3.0. When the treatment with aqueous solutions of the polytungstic acids is carried out under pH conditions greater than 3.0 and in some instances greater than 1.5, e. g., in the case of the silicotungstic acids, the polymeric quaternary ammonium polytungstates so formed are of varying composition, the structures of which are not known, and do not in general exhibit the superior thermal resistivity of the polymeric quaternary ammonium polytungstates prepared in the lower pH ranges. Although improvement in thermal resistivity is obtained even at a pH above 1.5 with silicotungstic acid and even at pH above 3.0 for polytungstic acids in general, depending upon the temperature and time of treatment, varying proportions of the simple quaternary groups will be converted to the desired polytungstate groups. Accordingly, the polymers of this invention can contain in combined form extralinear ammonium nitrogens which are singly ionically bonded to anions of the simple acids. Complete conversion of all the starting simple anions to the desired polytungstate anion can be achieved by using longer reaction times, more highly concentrated treating solutions, higher temperature, or, preferably, by carrying out the reaction in solution, i. e., by using a solution of the polymer and a solution of the polytungstic acid involved, preferably in miscible or compatible solvents. The choice of solvents will vary with the nature of the polymer involved and will include for example, alcohols, halogenated hydrocarbons, aromatic hydrocarbons, cyclic tetramethylene sulfone, dimethylformamide and the like. Solvents for polytungstic acids include alcohols and ethers. The aqueous solutions of the polytungstic acids can be obtained by simply dissolving the requisite polytungstic acid in sufficient water to obtain the desired concentration which can be from 0.1% to 10% and even higher and usually suitably adjusting the pH of the resultant solution. To obtain the higher concentrations, it frequently is necessary to employ the alkali metal salts. Alternatively, the polytungstic acids desired can be prepared directly in the aqueous treating solution by simply dissolving the theoretical molar quantities, in the concentrations desired, of the soluble alkali metal or alkaline earth metal salts of the simple component acids involved in the molecular structure of the polytungstic acid and suitably adjusting the pH of the solution. For instance, an aqueous solution of isopolytungstic acid can be prepared by dissolving in the weight concentration desired an alkali metal tungstate and adjusting the pH to 3.0 or below, preferably below 2.5. Similarly, an aqueous solution of phosphotungstic acid may be prepared by dissolving in the weight concentrations desired one molar proportion of an alkali metal phosphate with twelve molar proportions of an alkaline earth metal tungstate and adjusting the pH to below 3.0, and preferably below 2.5.

The polymers and copolymers of this invention are useful in the preparation of oriented shaped objects such as films or fibers, particularly the latter, which have excellent strength and water resistance with good dye absorption properties, particularly with acid dyes. Furthermore, the polymers and copolymers of this invention have extremely good stability under conditions of high temperature.

The foregoing detailed description has been given for clearness of understanding only and no unnecessary limitations are to be understood therefrom. The invention is not limited to the exact details shown and described for obvious modifications will occur to those skilled in the art.

What is claimed is:

1. An addition polymer of at least 0.015% tungsten content, having a wholly carbon polymer chain, and having recurring extralinear quaternary ammonium polytungstate units wherein the valences of the quaternary ammonium nitrogen not satisfied by the anion nor connected to the polymer chain are satisfied by hydrocarbon radicals free from aliphatic unsaturation.

2. An addition polymer of at least 0.015% tungsten content, having a wholly carbon polymer chain, and having recurring extralinear quaternary ammonium polytungstate units wherein the quaternary ammonium nitrogen is bonded to the polymer chain through a negative group, is bonded to the polytungstate anion, and has its remaining valencies attached to hydrocarbon radicals, free from aliphatic unsaturation, all of whose free valences are attached to the quaternary nitrogen.

3. An addition polymer having a wholly carbon polymer chain and of at least 0.02% tungsten content having recurring units of two polymer chain carbons to one of which is bonded a $-(CO)_m ORN\equiv$ group wherein R is a divalent hydrocarbon radical, $m$ is a cardinal number not greater than one, one of the free valences of the nitrogen is attached ionically to a polytungstate anion, and the remaining valences of the nitrogen are satisfied by hydrocarbon radicals, free from aliphatic unsaturation, all of whose free valences are satisfied by the nitrogen.

4. An addition polymer having a wholly carbon polymer chain and of at least 0.02% tungsten content having recurring units of two polymer chain carbons to one of which is bonded an $ORN\equiv$ group wherein R is a divalent hydrocarbon radical, one of the free valences of the nitrogen is attached ionically to a polytungstate anion, and the remaining valences of the nitrogen are satisfied by hydrocarbon radicals, free from aliphatic unsaturation, all of whose free valences are satisfied by the nitrogen.

5. An addition polymer having a wholly carbon polymer chain and of at least 0.02% tungsten content having recurring units of two polymer chain carbons to one of which is bonded a $-COORN\equiv$ group wherein R is a divalent hydrocarbon radical, one of the free valences of the nitrogen is attached ionically to a polytungstate anion, and the remaining valences of the nitrogen are satisfied by hydrocarbon radicals, free from aliphatic unsaturation, all of whose free valences are satisfied by the nitrogen.

6. An addition polymer having a wholly carbon polymer chain and of at least 0.02% tungsten content having recurring units of two polymer chain carbons to one of which is bonded, through pyridinium ring carbon, a quaternary pyridinium ring, the pyridinium nitrogen being bonded ionically to a polytungstate anion, to pyridinium ring carbons and to a monovalent hydrocarbon radical, free from aliphatic unsaturation.

7. An addition polymer having a wholly carbon polymer chain and of at least 0.02% tungsten content having recurring units of two polymer chain carbons to one of which is bonded a $-(CO)_m OAlkN\equiv$ group wherein Alk is a saturated divalent aliphatic hydrocarbon radical of at least two carbons between the free valences, $m$ is a cardinal number not greater than one, one of the free valences of the nitrogen is attached ionically to a polytungstate anion, and the remaining valences of the nitrogen are satisfied by hydrocarbon radicals, free from aliphatic unsaturation, all of whose free valences are satisfied by the nitrogen.

8. An addition polymer having a wholly carbon polymer chain and of at least 0.02% tungsten content having recurring units of two polymer chain carbons to one of which is bonded an OAlkN≡ group wherein Alk is a saturated divalent aliphatic hydrocarbon radical of at least two carbons between the free valences, one of the free valences of the nitrogen is attached ionically to a polytungstate anion, and the remaining valences of the nitrogen are satisfied by hydrocarbon radicals, free from aliphatic unsaturation, all of whose free valences are satisfied by the nitrogen.

9. An addition polymer having a wholly carbon polymer chain and of at least 0.02% tungsten content having recurring units of two polymer chain carbons to one of which is bonded, through pyridinium ring carbon, a quaternary pyridinium ring, the pyridinium nitrogen being bonded ionically to a polytungstate anion, to pyridinium ring carbons and to an alkyl radical.

10. An acrylonitrile copolymer having a wholly carbon polymer chain and of major acrylonitrile content containing at least 0.02% tungsten in the form of polymer units having extralinear quaternary ammonium polytungstate groups wherein the valences of the quaternary ammonium nitrogen not satisfied by the anion nor connected to the polymer chain are satisfied by hydrocarbon radicals free from aliphatic unsaturation.

11. An acrylonitrile copolymer having a wholly carbon polymer chain and of major acrylonitrile content and containing at least 0.02% tungsten in the form of recurring units of two polymer chain carbons to one of which is bonded a —(CO)$_m$ORN≡ group wherein R is a divalent hydrocarbon radical, $m$ is a cardinal number not greater than one, one of the free valences of the nitrogen is attached ionically to a polytungstate anion, and the remaining valences of the nitrogen are satisfied by hydrocarbon radicals, free from aliphatic unsaturation, all of whose free valences are satisfied by the nitrogen.

12. An acrylonitrile copolymer having a wholly carbon polymer chain and of major acrylonitrile content and containing at least 0.02% tungsten in the form of recurring units of two polymer chain carbons to one of which is bonded a —(CO)$_m$OAlkN≡ group wherein Alk is a saturated divalent aliphatic hydrocarbon radical of at least two carbons between the free valences, $m$ is a cardinal number not greater than one, one of the free valences of the nitrogen is attached ionically to a polytungstate anion, and the remaining valences of the nitrogen are satisfied by hydrocarbon radicals, free from aliphatic unsaturation, all of whose free valences are satisfied by the nitrogen.

13. A copolymer according to claim 12 wherein the polytungstate anion is a heteropolytungstate anion.

14. An acrylonitrile copolymer having a wholly carbon polymer chain and of major acrylonitrile content and containing at least 0.02% tungsten in the form of recurring units of two polymer chain carbons to one of which is bonded an OAlkN≡ group wherein Alk is a saturated divalent aliphatic hydrocarbon radical of at least two carbons between the free valences, one of the free valences of the nitrogen is attached ionically to a polytungstate anion, and the remaining valences of the nitrogen are satisfied by hydrocarbon radicals, free from aliphatic unsaturation, all of whose free valences are satisfied by the nitrogen.

15. An acrylonitrile copolymer having a wholly carbon polymer chain and of major acrylonitrile content and containing at least 0.02% tungsten in the form of recurring units of two polymer chain carbons to one of which is bonded, through pyridinium ring carbon, a quaternary pyridinium ring, the pyridinium nitrogen being bonded ionically to a polytungstate anion, to pyridinium carbons and to an alkyl radical.

16. A copolymer according to claim 15 wherein the polytungstate anion is a heteropolytungstate anion.

17. Process for improving the thermal stability of acrylonitrile polymers having a wholly carbon polymer chain of major acrylonitrile content containing a minor proportion of polymer units having attached to polymer chain carbons extralinear quaternary ammonium salt groups wherein the salt anion is that of a simple acid and wherein the valences of the quaternary ammonium nitrogen not satisfied by the anion nor connected to the polymer chain are satisfied by hydrocarbon radicals free from aliphatic unsaturation which process comprises bringing said copolymer in contact with an aqueous solution containing a polytungstate anion until at least 0.02%, by weight of the polymer, of tungsten is incorporated into the composition of the polymer.

18. The process of claim 17 wherein the polytungstate anion is a heteropolytungstate anion.

19. The process of claim 17 wherein the polytungstate anion is the phosphotungstate anion.

20. Process for improving the thermal stability of acrylonitrile polymers having a wholly carbon polymer chain of major acrylonitrile content containing a minor proportion of units of two chain carbons to one of which is bonded a —(CO)$_m$OAlkN≡ group wherein Alk is a saturated divalent aliphatic hydrocarbon radical of at least two carbons between the free valences, $m$ is a cardinal number not greater than one, one of the free valences of the nitrogen is attached ionically to the anion of a simple acid and the remaining valences of the nitrogen are satisfied by hydrocarbon radicals, free from aliphatic unsaturation, all of whose free valences are satisfied by the nitrogen, which process comprises bringing said copolymer in contact with an aqueous solution containing a polytungstate anion until at least 0.02%, by weight of the polymer, of tungsten is incorporated into the composition of the polymer.

21. Process for improving the thermal stability of acrylonitrile polymers having a wholly carbon polymer chain of major acrylonitrile content containing a minor proportion of units of two chain carbons to one of which is bonded an OAlkN≡ group wherein Alk is a saturated divalent aliphatic hydrocarbon radical of at least two carbons between the free valences, one of the free valences of the nitrogen is attached ionically to the anion of a simple acid and the remaining valences of the nitrogen are satisfied by hydrocarbon radicals, free from aliphatic unsaturation, all of whose free valences are satisfied by the nitrogen, which process comprises bringing said copolymer in contact with an aqueous solution containing a polytungstate anion until at least 0.02%, by weight of the polymer, of tungsten is incorporated into the composition of the polymer.

22. Process for improving the thermal stability of acrylonitrile polymers having a wholly carbon polymer chain of major acrylonitrile content containing a minor proportion of units of two chain carbons to one of which is bonded, through pyridinium ring carbon, a quaternary pyridinium ring, the pyridinium nitrogen being bonded ionically to the anion of a simple acid and the remaining valences of the nitrogen are satisfied by hydrocarbon radicals, free from aliphatic unsaturation, all of whose free valences are satisfied by the nitrogen, which process comprises bringing said copolymer in contact with an aqueous solution containing a polytungstate anion until at least 0.02%, by weight of the polymer, of tungsten is incorporated into the composition of the polymer.

23. Process for improving the thermal stability of an addition polymer having a wholly carbon polymer chain and having recurring extralinear quaternary ammonium salt groups wherein the anion is that of a simple acid and wherein the valences of the quaternary ammonium nitrogen not satisfied by the anion nor connected to the polymer chain are satisfied by hydrocarbon radicals free from aliphatic unsaturation which process comprises bringing said polymer in contact with an aqueous solution containing a polytungstate anion until at least 0.02%, by weight of the polymer, of tungsten is incorporated into the composition of the polymer.

24. An acrylonitrile copolymer having a wholly carbon polymer chain and of major acrylonitrile content and containing at least 0.02% tungsten in the form of recurring units of two polymer chain carbons to one of which is bonded a —COOAlkN≡ group wherein Alk is a saturated divalent aliphatic hydrocarbon radical of at least two carbons between the free valences, one of the free valences of the nitrogen is attached ionically to a polytungstate anion, and the remaining valences of the nitrogen are satisfied by hydrocarbon radicals, free from aliphatic unsaturation, all of whose free valences are satisfied by the nitrogen.

25. An acrylonitrile copolymer having a wholly carbon polymer chain, of major acrylonitrile content, and containing at least 0.02% tungsten in the form of recurring β-methacrylyloxyethyltrimethylammonium phosphotungstate units.

26. An acrylonitrile copolymer having a wholly carbon polymer chain and of major acrylonitrile content and containing at least 0.02% tungsten in the form of recurring 2-vinyloxyethyltrimethylammonium phosphotungstate units.

27. An acrylonitrile copolymer having a wholly carbon polymer chain and of major acrylonitrile content and containing at least 0.02% tungsten in the form of recurring 1,2-dimethyl-5-vinylpyridinium phosphotungstate units.

References Cited in the file of this patent

UNITED STATES PATENTS

| Number | Name | Date |
|---|---|---|
| 2,601,251 | Bruson | June 24, 1952 |